United States Patent

Lins

[15] 3,660,826

[45] May 2, 1972

[54] NOISE PROTECTION AND ROLLOVER LOCKOUT FOR KEYBOARDS

[72] Inventor: Stanley J. Lins, Minneapolis, Minn.

[73] Assignee: Sperry Rand Corporation, New York, N.Y.

[22] Filed: Oct. 2, 1970

[21] Appl. No.: 77,467

[52] U.S. Cl. ........................340/173 R, 340/172.5, 340/166

[51] Int. Cl. ........................................................G11c 11/36

[58] Field of Search ...............340/173 SP, 172.5, 173 R, 166

[56] References Cited

UNITED STATES PATENTS

| | | | |
|---|---|---|---|
| 3,028,659 | 4/1962 | Chow | 340/173 SP |
| 3,488,636 | 6/1970 | Dyck | 340/173 SP |

*Primary Examiner*—Terrell W. Fears
*Attorney*—Thomas J. Nikolai, Kenneth T. Grace, Donald W. Phillion and John P. Dority

[57] ABSTRACT

An electronic circuit for use with an operator keyboard for preventing erroneous data generation which may otherwise occur because of contact bounce or by the substantially simultaneous closure of more than one key at a time. A pair of cross-coupled monostable multivibrators (one-shots) are coupled by coincidence circuits to the keyboard and keyboard encoder so as to control the generation of "Keyboard Ready" control pulses.

The first contact closure of a single key causes one of the one-shots to trigger on and to generate a single "Keyboard Ready" pulse. It also locks out the second one-shot circuit and prevents and subsequent triggering pulses caused by contact bounce from reactivating the first one-shot and producing additional "Keyboard Ready" control pulses until the first one-shot has again reverted to its stable state. Additionally, a monitor circuit is provided which senses whether more than one key on the keyboard is simultaneously depressed. This monitor circuit is coupled to the above described circuitry and prevents the generation of "Keyboard Ready" control pulses until a single key condition is restored.

5 Claims, 1 Drawing Figure

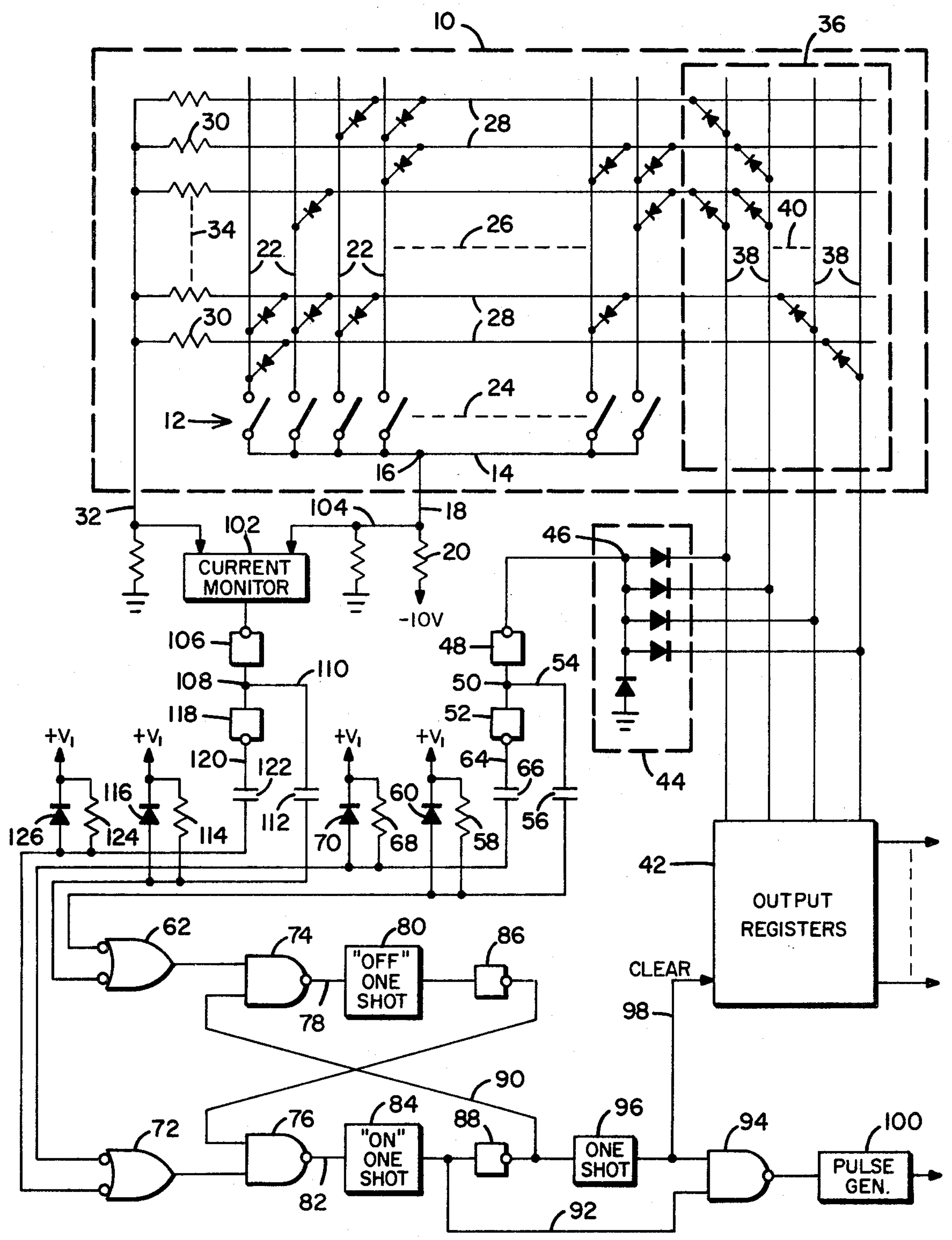
INVENTOR
STANLEY J. LINS
BY Thomas J Nikolai
ATTORNEY

NOISE PROTECTION AND ROLLOVER LOCKOUT FOR KEYBOARDS

BACKGROUND OF THE INVENTION

Manually operated keyboard data entry devices are commonly used in digital data processing equipment and display apparatus. The keyboard normally comprises a plurality of manually operable key-controlled single pole single throw switches. These switches are coupled through an encoding device so as to generate a unique digital signal pattern representative of a particular key which has been depressed. The output from the encoder may be connected as in input to a register which services to temporarily store the data pattern until it can be accepted by the utilization device which may be a digital computer or an alphanumeric display device. Once the data is in the output register, the keyboard generates a signal termed a "Keyboard Ready" signal which indicates to the utilization device that data for it is available in the output register and can be sampled.

When mechanical switches are employed, contact bounce may create a problem unless steps are taken to obviate it. Contact bounce generally results in a plurality of contact openings and closings and may either cause erroneous data to be entered into the keyboard output register or may cause more than one "Keyboard Ready" signal to be transmitted to the utilization device.

Further, with a manually operated keyboard, it oftentimes happens that the operator may simultaneously depress more than one key at a time, which could result in an ambiguity in the data entered into the output register. Because one does not desire to transmit or utilize ambiguous data, it is imperative that means be provided for cleaning out this ambiguous data from the output register and replacing it with unambiguous data.

The present invention provides an electronic lockout circuit for a keyboard which obviates both the contact bounce problem and the keyboard "rollover" problem. As used herein, "rollover" refers to going from one-to-two and two-to-one key conditions on the keyboard.

In known prior art systems designed to solve the rollover problem, it is common practice to include a current metering resistor for each key used in the keyboard. Thus, when more than one key is depressed, two or more units of current are applied to a threshold detecting circuit having its threshold set at one unit of current. Hence, the monitor detects when more than one key is depressed. This prior art technique is wasteful in terms of components. For large sized keyboards, for example, one having 90 keys, 90 separate resistors would be required. In the present invention, each key is connected to two selection diodes and each selection diode is, in turn, connected to one of 27 lines, each of which contains a current metering resistor. As in the prior art system, these current metering resistors are in combination with a threshold detecting system and are used to detect the rollover condition. However, in the present invention, because of the unique design of the selection diode matrix, only 27 resistors are required for monitoring a keyboard of 90 switches. Thus, the keyboard protection circuit of this invention is more economical in its implementation than known prior art arrangements.

Accordingly, it is an object of this invention to provide a new design for a keyboard protection circuit which obviates problems caused by contact bounce and contact rollover.

Another object of the invention is to provide an improved keyboard protection circuit which is reliable and economical in terms of component cost.

Still another object of the invention is to provide in combination with a manually operated keyboard a protection circuit which allows a utilization device to sample the keyboard data only once for each closure of a particular key even though the key operated switch produces multiple impulses due to contact bounce.

These and other objects of the invention will become apparent to those skilled in the art from reading the following specification in light of the accompanying single FIGURE which illustrates by means of an electrical and logic schematic diagram, the preferred embodiment of the invention.

DESCRIPTION OF THE PREFERRED EMBODIMENT

Referring now to the single FIGURE, shown enclosed by dashed rectangle 10 are the manually operated key type switches indicated generally by the numeral 12. Each switch may be a single pole, single throw type with one side thereof connected in common by a conductor 14 to a junction 16. Junction 16 is connected by means of a conductor 18 and a resistor 20 to a source of potential which may, for example, be −10 volts. Associated with one contact of each of the switches 12 is a column conductor 22. While in the drawing only six key operated switches are illustrated, many additional switches may be connected in and the dashed lines 24 and 26 are intended to represent additional ones of such switches and associated column conductors.

Intersecting the column conductors are a plurality of row conductors 28. Each of these row conductors has one terminal connected to a first terminal of a plurality of current metering resistors 30 the other terminals of which are connected to a common bus 32.

In accordance with the teachings of this invention, each column conductor 22 is coupled by semiconductor diodes to two and only two row conductors. Thus, the closure of any one of the switches 12 is effective to cause a voltage change on only two of the row conductors. While in the FIGURE only five such row conductors are illustrated, it is to be understood that in a complete system, many other row conductors are also employed as represented by the dashed line 34.

The row conductors and those column conductors having one of the manually operated switches 12 in series therewith along with the associated diodes coupling these column conductors to the row conductors are referred to herein as the diode selection matrix. The output from this diode selection matrix is coupled to another matrix termed the encoding matrix. In the drawing, this encoding matrix is shown enclosed by dashed line box 36. As can be seen, the encoding matrix 36 utilizes the same row conductors as the diode selection matrix but in addition has its own set of column conductors 38. Again, the row and column conductors are coupled together in a predetermined manner by semiconductor diodes, such that a predetermined group of pulses unique to the several switches is generated in response to the closure thereof. In the drawing, for simplicity, only four such encoding matrix column conductors are shown. However, in a system incorporating a larger number of keys, additional lines would be provided as indicated by the dashed line 40. For example, where the keyboard has 90 key operated switches, the encoding matrix 36 may have seven column conductors 38 such that 27 different code combinations can be represented. This will permit a total of 128 different switches to be uniquely identified.

THe column conductors 38 are coupled to a digital output register 42 which serves to at least temporarily store the digital pulse pattern developed on the conductors 38 when one of the manually operated switches 12 is closed.

Each of the column conductors 38 of the encoding matrix 36 is also connected to the input of a diode logic OR circuit shown enclosed by dashed line box 44. OR circuit 44 operates in a conventional fashion to alter the voltage existing at the output terminal 46 whenever one or more of the column conductors 38 are pulsed upon the closure of a particular one of the switches 12.

The junction 46 is coupled through a first inverter 48 to a junction point 50. The output from inverter 48 appearing at junction 50 is also applied as an input to a second inverter 52. Junction 50 is coupled by way of a conductor 54 and through a differentiating network consisting of a capacitor 56, a resistor 58 and a diode 60 to a first input terminal of a logic NOR circuit 62. The output from inverter 52 appearing on conductor 64 is connected through a differentiating network consisting of a capacitor 66, a resistor 68 and a diode 70 to a first input terminal of a second logic NOR circuit 72. Diodes 60 and 70 serve to clamp the voltages at the input of the NOR circuits 62 and 72 to a value no more positive than $+V_1$ when a pushbutton switch opens thus preventing the formation of a positive spike on $V_1$. The output from NOR circuit 62 is coupled to a first input terminal of a logic NAND circuit 74 while the output of NOR circuit 72 is coupled to a first input terminal of logic NAND circuit 76. NAND circuit 74 provides an output on conductor 78 whenever the AND condition of the gate is satisfied. The signal appearing on line 78 serves as a trigger input for a monostable multivibrator or one-shot 80. In a similar fashion, the NAND circuit 76 has its output coupled by way of a conductor 82 to the trigger input of a monostable multivibrator 84. As is well known in the art, when a monostable multivibrator is triggered by a momentary input signal, it reverts from a first stable to a second stable state for a period of time determined by the components used in the circuit and then automatically reverts to the first state.

The output from the multivibrator 80 is coupled through an inverter 86 to the second input of NAND circuit 76. Similarly, the output from the one-shot circuit 84 is coupled through an inverter 88 to the second input terminal of gate 74 by way of a conductor 90.

The direct output from the one-shot 84 is also conveyed by way of conductor 92 to a first input terminal of another logic NAND circuit 94. The other input to the NAND circuit 94 comes from the output of inverter 88 by way of another monostable multivibrator 96. In addition to providing the second input to the NAND gate 94, the one-shot 96 also has its output coupled to the "Clear" terminal 98 of the output register 42.

The output from NAND gate 94 is used to trigger a pulse generator 100, which pulse generator provides the Keyboard Ready signal to the utilization device (not shown).

The common conductor 32 which is coupled to one side of each of the current metering resistors 30 is connected as a first input to a differential amplifier circuit 102. The other input to differential amplifier 102 comes from the junction 16 by way of conductors 18 and 104.

The output from differential amplifier 102 is coupled through an inverter 106 to a junction 108 and from there by way of a conductor 110 and a differentiating circuit including capacitor 112, resistor 114 and diode 116 to the second input terminal of NOR circuit 62. The output from inverter 106 appearing at junction 108 is also applied as an input to an inverter 118 whose output is coupled by a conductor 120 and a differentiating circuit including a capacitor 122, a resistor 124 and a diode 126 to the second input terminal NOR circuit 72. Diodes 116 and 126 serve the same purpose as diodes 60 and 70.

Now that the details of the construction of the preferred embodiment have been described, consideration will be given to its mode of operation.

OPERATION

With the circuit in its quiesent condition with none of the switches 12 depressed, the potential at junction 46 will be relatively high while the potential at junction 50 is low. The one-shot circuits 80 and 84 will have reached their quiesent state such that a relatively high potential will be applied to one input terminal of each of the gates 74 and 76 by way of the cross-coupling path between the one-shot circuits. The positive signal applied to the first input terminals of gates 74 and 76 partially enables these gates and they stand ready to pass a triggering signal to their associated one-shot as soon as the other terminal of the gate is simultaneously made to go positive.

When one of the keys 12 is depressed, a current path is established from ground through the OR circuit 44, through one or more of the diodes in the encoding matrix 36 and through the diodes in the selection matrix, through the closed switch to the junction 16 and through resistor 20 to the −10 volt source. The effect of this current flow is to cause the potential at junction 46 to go low. This signal is inverted by inverter 48 such that the potential at junction 50 becomes high. Because of inverter 52, the signal on conductor 64 becomes low. As the signal on line 64 changes from high to low, the differentiator circuit including capacitor 66 and resistor 68 produces a negative going spike which passes through NOR circuit 72 causing a positive signal to be applied to the second input terminal of the NAND gate 76. The signal on conductor 54 in going from low to high causes the NOR 62 to produce a negative going spike which will not enable the gate 74. Hence, only gate 76 will produce a triggering signal to turn on the one-shot 84.

One-shot circuits 80 and 84 are designed to produce a positive going signal for an approximate duration of 10 milliseconds when triggered. The positive going signal from one-shot 84 is inverted by circuit 88 such that a negative signal is applied by way of conductor 90 to the first input terminal of NAND circuit 74. This negative signal at this terminal blocks the NAND circuit and prevents the one-shot circuit 80 from being triggered during the 10 millisecond interval that one-shot 84 is active.

The output from inverter 88 is applied to a second one-shot circuit 96 which serves to produce a signal on the conductor 98 which clears out the contents of the output register 42. Subsequent to the clearing of the output register 42 the digital data identifying the particular key which has been depressed is entered into the output register. The duration of the signal from one-shot 96 is substantially less than that of one-shot 84. After one-shot 96 has completed its cycle, NAND circuit 94 will be fully enabled and will output a signal for triggering the pulse generator 100 to thereby generate a Keyboard Ready signal. Thus, the pulse generator 100 does not advise the associated utilization device that data is available in the output register 42 until such time as error free data has been inserted in the output register ready for transmission.

Upon completion of the 10 millisecond pulse from the one-short circuit 84, the signal on conductor 90 will again go positive to partially enable the NAND circuit 74. Now, when the pushbutton key is released and the switch 12 assumes its open position once again, the potential at junction 46 will again go high and a relatively low signal will appear at junction 50 and will be applied by way of conductor 54 and differentiating circuit including capacitor 56 and resistor 58 to the NOR circuit 62. The output from NOR 62 will be positive and hence gate 74 will be fully enabled and will produce a signal on conductor 78 for triggering the one-shot circuit 80. The positive going 10 millisecond pulse from one-shot 80 is inverted by circuit 86 and is coupled to an input terminal of NAND circuit 76. Since this is a negative going signal, NAND circuit 76 will be disabled such that noise signals which may be generated upon the opening of the manually operated switch 12 cannot trigger the one-shot circuit 84 and produce a Keyboard Ready signal from the pulse generator circuit 100.

After the cycle of the one-shot circuit 80 is completed, the output from inverter circuit 86 will again become positive to partially enable the NAND gate 76 in anticipation of the receipt of the next positive going signal from NOR circuit 72 upon the closure of another switch.

Thus it can be seen that the circuitry thus far described is operative to ensure that only a single Keyboard Ready pulse is generated upon the closure of one of the keyboard switches 12 in spite of the fact that the closing and opening of the contact may produce numerous pulses due to contact bounce.

Now that the noise protection feature of the invention has been described, consideration will be given to the operation of the rollover lockout circuit. As was mentioned previously, rollover refers to going from one-to-two and two-to-one key conditions on the keyboard.

In the preferred embodiment, each key is connected to two selection diodes by way of one of the column conductors 22.

Each selection diode, in turn, is connected to one of a plurality of row conductors 28, each of which contains a current metering resistor 30. These resistors, in combination with a current monitoring circuit are used to detect a keyboard rollover condition. The rollover detection circuit feeds into the noise protection circuit already described to provide the desired lockout.

Referring to the signal FIGURE, as any one key is depressed, two units of current flow through the current monitoring circuit 102 since each column conductor 22 is coupled to two row conductors 28. Current monitor 102 is a differential amplifier having a preset threshold. As long as only a single key is depressed, the current monitor will have a low potential at its output such that after passing through inverter 106, the junction 108 will be at a high potential. Because of inverter 118, the signal appearing on conductor 120 at this time will be also a low potential.

As a second key is depressed along with the first, at least one additional current metering resistor will be brought into the circuit and, hence, three or more units of current will flow through the monitoring circuit. This causes the threshold established in current monitor 102 to be exceeded and the output therefrom will go high. Thus, junction 108 goes low and when this signal is differentiated by capacitor 112 and resistor 114, a short rise time positive pulse will be emitted from the NOR circuit 62 to fully enable NAND circuit 74 and trigger the one-shot circuit 80. For a period of approximately 10 milliseconds, inverter 86 will output a negative signal which blocks the NAND circuit 76 to prevent the one-shot 84 from being triggered. As a result, no Keyboard Ready pulses can be emitted from the pulse generator circuit 100.

Next, when the operator lifts one finger such that a one key condition is restored, the output of the current monitor 102 will go low. Because of inverters 106 and 118, the potential on conductor 120 will also go low at this time and this signal will be differentiated and will cause NOR circuit 72 to output a positive signal to fully enable the NAND gate 76. One-shot circuit 84 will be triggered in the same fashion already described and will cause the output register 42 to be cleared. The new data word representative of the single key which is still depressed passes from the encoder matrix 36 by way of the conductors 38 to the output register where the signals are temporarily stored while the pulse generator 100 emits a pulse to indicate to the utilization device that data is available in the output register 42 and can be sampled.

Thus it can be seen that the rollover protection circuit including the current metering resistors, the current monitor 102, the inverters 106 and 118 are operative to block the generation of a Keyboard Ready pulse when more than one key is depressed at a time. Also, when the one key condition is restored, these circuits are operative to trigger the one-shot 84 to clear out the garbled or ambiguous data from the output register 42 prior to reloading this register with new data identifying the particular key which is still depressed.

It will be obvious to those skilled in the art that there are modifications of the circuitry employed to implement the present invention that may be made. While a particular embodiment has been discussed and described in detail, it will be understood that the invention is not limited thereto and that it is contemplated to cover any such modifications as fall within the true spirit and scope of the invention as defined in the appended claims.

What is claimed is:

1. An electronic keyboard circuit comprising in combination a. a plurality of manually operable electrical switches;

b. a diode selection matrix including a plurality of row conductors and column conductors coupled together at predetermined locations by semiconductor diodes, each column conductor being connected to one of said plurality of electrical switches;

c. diode encoding means coupled to said row conductors for producing patterns of digital pulses representing the particular one of said plurality of switches which is operated;

d. a storage register adapted to receive said patterns of digital pulses for at least temporarily storing said patterns until utilized by a utilization device;

e. signaling means for generating control pulses indicating to said utilization device that said storage register has a pattern of digital signals therein; and f. electronic lockout means coupled to said diode encoding means and to said signaling means for permitting the generation of only a single control pulse upon the closure of one or more of said plurality of switches.

2. Apparatus as in claim 1 wherein said electronic lockout means comprises:

first and second monostable multivibrators each having an input terminal and an output terminal:

first and second coincidence circuits, each having a pair of input terminals and an output terminal, said output terminals of said first and second coincidence circuits being connected respectively, to the input terminal of said first and second monostable multivibrators;

means connecting the output terminal of said first multivibrator to said signaling means and to a first of said pair of input terminals on said second coincidence circuit and the output terminal of said second multivibrator to a first input terminal on said first coincidence circuit; and means coupling said diode encoding means to the second of said pair of input terminals on said first and second coincidence circuits for triggering said first monostable multivibrator and generating a single one of said control pulses upon the closure of one of said plurality of manually operated switches, the output of said first monostable multivibrator blocking said second coincidence circuit for a predetermined time period to thereby inhibit said signaling means from generating additional control pulses during said time period.

3. Apparatus as in claim 2 and further including:

sensing means for sensing whether more than one of said plurality of manually operated switches is closed at a given time;

means coupling said sensing means to said second terminals of said first and second coincidence circuits for triggering said second monostable multivibrator when more than one of said manually operated switches are simultaneously closed to thereby prevent said first monostable multivibrator from triggering said signaling means until one and only one of said manually operated switches is in its closed condition.

4. Apparatus as in claim 2 wherein said coincidence circuits are NAND type logic circuits.

5. Apparatus as in claim 3 wherein said sensing means comprises at least one current metering resistor connected in series circuit with each of said row conductors;

a differential amplifier having first and second input terminals and an output terminal;

means connecting said first input terminal of said differential amplifier to a source of reference potential;

means connecting said second input terminal of said differential amplifier to one terminal of each of said current metering resistors; and means coupling said output terminal of said differential amplifier to said second terminals of said first and second coincidence circuits.

* * * * *